Patented June 5, 1934

1,961,623

UNITED STATES PATENT OFFICE 1,961,623

OXIDATION OF ALICYCLIC ALCOHOLS AND KETONES

Earl L. Pelton, Midland, Mich., assignor to The Dow Chemical Company, Midland, Mich., a corporation of Michigan No Drawing. Application August 31, 1933, Serial No. 687,683

17 Claims. (Cl. 260—108)

This invention concerns an improved method of oxidizing alicyclic alcohols and ketones, and particularly concerns the oxidation of cyclohexanol and cyclohexanone.

It is well known that when cyclohexanol or cyclohexanone is reacted with a strong oxidizing agent, e. g. potassium permanganate or concentrated nitric acid, adipic acid is formed as the major product.

I have now found that, when cyclohexanol or cyclohexanone is oxidized with fused caustic alkali, salts of caproic acid, cyclohexyl-butyric acid, and a higher acid having the empirical formula $C_{12}H_{20}O_2$ are the major products, very little, if any, adipic acid salt being formed.

I have further found that in the reaction of cyclohexanol or cyclohexanone with fused caustic alkali, the relative yields of the three major products mentioned above may be controlled. The presence of water in the fused reaction mixture and the employment of a high reaction temperature, e. g. 330–360° C., favors the formation of caproic acid salts. Conversely, the employment of substantially anhydrous fused caustic alkali and of lower reaction temperatures favors the formation of salts of the acid $C_{12}H_{20}O_2$. Sodium hydroxide tends to produce a salt of the acid $C_{12}H_{20}O_2$ in greater yield, and salts of caproic acid and cyclohexyl-butyric acid in lower yield, than does potassium hydroxide under similar operating conditions. Thus the relative yields of the three aforementioned products can largely be controlled by regulating the reaction temperature, the quantity of water present, and the composition of the caustic alkali.

To the accomplishment of the foregoing and related ends, the invention consists in the method hereinafter fully described and particularly pointed out in the claims, the following description and examples setting forth in detail only several of the various ways in which the principle of the invention may be employed.

The procedure which I employ in practicing the invention is gradually to introduce liquid or vaporized cyclohexanol or cyclohexanone into contact with fused caustic alkali, while stirring the latter. The reaction can be carried out at any desired pressure and at any temperature between 250° C. and 370° C., but is most advantageously carried out at atmospheric pressure and at temperatures between 275° and 360° C. The reaction is often sluggish when started at the lower temperatures within the above range, e. g. at 250–300° C., but I have found that it can be catalyzed by adding an organic carboxylic acid or salt thereof. An alkali metal salt of an acid product from the reaction, e. g. sodium caproate, is preferably employed for such purpose.

During the introduction of cyclohexanol or cyclohexanone, as described above, a portion of the same is usually vaporized from the mixture without reacting. Such unreacted cyclohexanol or cyclohexanone may be condensed from the evolved gases and returned to the reaction. The introduction of cyclohexanol or cyclohexanone is preferably continued until from 85 to 95 per cent of the caustic alkali is reacted.

The acid products may be isolated through usual procedure, e. g. fractional distillation, fractional crystallization of salts thereof, etc. In practice, I find it most convenient to cool the above mentioned alkaline reaction mixture, steam distill it to remove traces of unreacted cyclohexanol or cyclohexanone and other organic impurities, and then to acidify the residual mixture to liberate the free organic acid products. The mixture of organic acids is fractionally distilled, preferably under vacuum, to isolate the individual acids.

In the above described general procedure, any alkali metal hydroxide, e. g. sodium hydroxide, potassium hydroxide, or a mixture thereof, may be employed as the caustic alkali reactant. When the alkali metal hydroxide is employed at a reaction temperature below its melting point, sufficient water must be added to maintain the mixture in molten condition. However, the presence of water in a reaction mixture or the employment of a relatively high reaction temperature promotes the formation of salts of the lower acids, particularly caproic acid, at the expense of salts of the higher acid product, $C_{12}H_{20}O_2$. For the maximum production of the latter, therefore, it is essential that the reaction be carried out under as nearly anhydrous conditions as possible and at a relatively low temperature, e. g. 275–320° C. This may be accomplished by employing an anhydrous fused mixture of sodium and potassium hydroxides, preferably in a molecular ratio between $$\frac{1\text{NaOH}}{2\text{KOH}} \text{ and } \frac{3\text{NaOH}}{1\text{KOH}}.$$

Such anhydrous mixture is molten at temperatures as low as 250° C.

The caproic acid salt is produced in maximum yield by reacting moist cyclohexanol or cyclohexanone with fused caustic alkali, preferably potassium hydroxide, saturated with water at the higher reaction temperatures, e. g. 330–360° C. In the above described reaction, the yield of cyclohexyl-butyric acid is highest when the reaction is carried out at a somewhat lower temperature, e. g. 290–320° C., using fused caustic alkali, preferably potassium hydroxide, likewise saturated with water. However, cyclohexyl-butyric acid can be produced in maximum yield by oxidizing the hereinbefore mentioned higher acid, $C_{12}H_{20}O_2$, with fused caustic alkali.

The following examples illustrates several ways in which the principle of my invention has been practiced, but are not to be construed as limiting the invention.

Example 1

5 moles of anhydrous sodium hydroxide, 5 moles of anhydrous potassium hydroxide, and 0.43 mole of caproic acid were mixed and heated to fusion. The fused mixture was stirred continuously and maintained at about 300° C. while cyclohexanol was gradually contacted therewith until 13.28 moles of cyclohexanol was reacted. The mixture was then cooled, dissolved in water, and traces of cyclohexanol and other organic impurities were steam distilled therefrom. The residual aqueous liquor was evaporated to about 3 liters volume. The solution was then acidified with hydrochloric acid to liberate the organic acid products which formed a distinct layer. The organic layer was separated and fractionally distilled under vacuum to isolate the individual organic acids. There were obtained 2.89 moles of caproic acid, 0.887 mole of cyclohexyl-butyric acid, and 4.113 moles of a third acid. The latter boiled at 195–198° C. at 38 millimeters pressure, froze at approximately −11° C., and had the specific gravity 0.9861 at 20° C. as compared with water at 4° C. It was found to have the empirical formula $C_{12}H_{20}O_2$, and is probably a decahydronaphthyl-acetic acid. The per cent of theoretical yields of the three acids, based on the quantity of cyclohexanol reacted, were: caproic acid, 18.5%; cyclohexyl-butyric acid, 13.4%; and $C_{12}H_{20}O_2$, 61.8%.

Example 2

5 moles of sodium hydroxide, 5 moles of potassium hydroxide, and 0.5 mole of the aforementioned acid of empirical formula $C_{12}H_{20}O_2$ were mixed and heated to 300° C., i. e. to fusion, and steam was passed over the fused mixture until the latter was saturated with water. The resultant mixture was stirred continuously and maintained at 300° C. while cyclohexanol was gradually contacted therewith until 9.9 moles of cyclohexanol was reacted. The organic acid products were isolated from the reacted mixture through procedure similar to that described in Example 1. There were obtained 1.7 moles of caproic acid, 0.65 mole of cyclohexyl-butyric acid, and 2.75 moles of the higher acid of empirical formula $C_{12}H_{20}O_2$. The per cent of theoretical yields of the three acids, based on the quantity of cyclohexanol reacted, were: caproic acid, 17.2%; cyclohexyl-butyric acid, 13.2%; and $C_{12}H_{20}O_2$, 45.6%.

Example 3

A fused mixture of 9.5 moles of sodium hydroxide and 0.5 mole of sodium caproate, which was saturated with water, was stirred continuously and maintained at 340° C. while cyclohexanol was gradually contacted therewith until 10.1 moles of cyclohexanol was reacted. The organic acid products were isolated through procedure similar to that described in Example 1. There were obtained 3.8 moles of caproic acid, 0.24 mole of cyclohexyl-butyric acid, and 2.05 moles of the acid of empirical formula $C_{12}H_{20}O_2$. The per cent of theoretical yields of the three acids, based on the quantity of cyclohexanol reacted, were: caproic acid, 32.7%; cyclohexyl-butyric acid, 4.8%; $C_{12}H_{20}O_2$, 40.6%.

Example 4

A fused mixture of 5 moles of sodium hydroxide, 5 moles of potassium hydroxide, and 0.5 mole of caproic acid, was stirred continuously and maintained at 340° C. while moist cyclohexanol, which had been saturated with water at room temperature and atmospheric pressure, was gradually contacted therewith. The operation was continued until 8.62 moles of cyclohexanol was reacted. The organic acid products were isolated, thereby obtaining 5.1 moles of caproic acid, 0.46 mole of cyclohexyl-butyric acid, and 0.66 mole of the acid of empirical formula $C_{12}H_{20}O_2$. The per cent of theoretical yields of the three acids, based on the quantity of cyclohexanol reacted, were: caproic acid, 53.3%; cyclohexyl-butyric acid, 10.7%; $C_{12}H_{20}O_2$, 15.3%.

Example 5

10 moles of fused potassium hydroxide, saturated with water, was stirred continuously and maintained at 350° C. while cyclohexanol, which was saturated with water at room temperature and atmospheric pressure, was gradually contacted therewith. The operation was continued until 9.0 moles of cyclohexanol was reacted. From the product there was obtained 5.85 moles of caproic acid, or 64 per cent the theoretical yield, based on the quantity of cyclohexanol reacted. Only traces of cyclohexyl-butyric acid and the higher acid, $C_{12}H_{20}O_2$ were obtained.

Example 6

294 grams (1.5 moles) of the aforementioned higher acid, $C_{12}H_{20}O_2$, was added gradually and with stirring to a fused mixture of 560 grams (10 moles) of potassium hydroxide and 50 grams of water. The mixture was maintained at approximately 340° C. during said operation. By acidifying the reacted mixture and separating the components thereof, 242 grams (1.425 moles) of cyclohexyl-butyric acid and 85.6 grams (1.425 moles) of acetic acid were obtained. The yield of cyclohexyl-butyric acid was 95 per cent of theoretical, based on the quantity of the acid $C_{12}H_{20}O_2$ employed.

A comparison of Example 1 with Example 2 shows that the employment of anhydrous caustic alkali, as contrasted with caustic alkali saturated with water, results in a high production of the acid $C_{12}H_{20}O_2$ and a relatively low production of caproic and cyclohexyl-butyric acids. A comparison of Example 3 with Example 4 shows that by employing a mixture of sodium and potassium hydroxides, rather than sodium hydroxide alone, under otherwise identical operating conditions, the relative yields of caproic and cyclohexyl-butyric acids are increased, while the yield of the acid $C_{12}H_{20}O_2$ is decreased. Example 5 shows that by employing moist potassium hydroxide alone as the oxidizing agent at a higher temperature, the yield of caproic acid can be increased greatly while the production of cyclohexyl-butyric acid and the acid $C_{12}H_{20}O_2$ can practically be eliminated. A comparison of Example 2 with Example 4 shows that as the reaction temperature is raised, the production of caproic acid is increased while the production of the acid $C_{12}H_{20}O_2$ is decreased.

While Examples 1–5 illustrate only the oxidation of cyclohexanol, cyclohexanone may be oxidized under similar conditions to produce the same respective products.

Other alicyclic alcohols and ketones, e. g. methyl-cyclohexanol, methyl-cyclohexanone, cyclohexyl-cyclohexanol, isoborneol, camphor, etc., have also been reacted with fused caustic alkali by procedure similar to that hereinbefore described to produce salts of organic mono-carboxylic acids. Insofar as I have been able to ascertain, any alicyclic alcohol or ketone may be oxidized by the present method to produce one or more salts of organic mono-carboxylic acids.

My invention is adapted to continuous practice. For instance, caustic alkali and an alicyclic alcohol or ketone may each be added continuously to a fused reaction mixture so as to build the latter up to and maintain it as a mixture containing a small portion, e. g. 15 per cent by weight, of unreacted caustic alkali and a relatively large portion, e. g. 80–85 per cent, of alkali metal salts of the organic acid products. During such operation, portions of the reaction mixture may be withdrawn, either intermittently or continuously, so as to maintain a substantially constant volume of material in the reactor. Said withdrawn material may be treated in accordance with procedure hereinbefore described to isolate the organic acid products.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of oxidizing a compound selected from the class consisting of alicyclic alcohols and ketones, the step which consists in reacting said compound with fused alkali metal hydroxide.

2. In a method of oxidizing a compound selected from the class consisting of alicyclic alcohols and ketones, the step which consists in contacting said compound with fused alkali metal hydroxide heated to a temperature between about 275° and about 360° C., while stirring the fused mixture.

3. In a method of oxidizing a compound selected from the class consisting of cyclohexanol and cyclohexanone, the step which consists in reacting said compound with fused alkali metal hydroxide.

4. In a method of oxidizing a compound selected from the class consisting of cyclohexanol and cyclohexanone, the step which consists in contacting said compound with fused alkali metal hydroxide heated to a temperature between about 275° and about 360° C., while stirring the fused mixture.

5. In a method of oxidizing cyclohexanol, the step which consists in reacting said compound with fused alkali metal hydroxide.

6. In a method of oxidizing cyclohexanol, the step which consists in reacting said compound with fused alkali metal hydroxide at a temperature between about 250° and about 370° C.

7. In a method of oxidizing cyclohexanol, the step which consists in contacting said compound, at approximately atmospheric pressure, with fused alkali metal hydroxide heated to between about 275° and about 360° C., while stirring the fused mixture.

8. In a method of oxidizing cyclohexanol, the steps which consist in reacting said compound with fused alkali metal hydroxide at a temperature between 250° and 370° C., acidifying the reacted mixture, and then separating therefrom the organic acid products.

9. In a method of oxidizing cyclohexanol, the steps which consist in reacting said compound with fused alkali metal hydroxide at a temperature between about 275° and about 360° C. and at approximately atmospheric pressure, acidifying the reacted mixture, and then separating therefrom the organic acid products.

10. In a continuous method of oxidizing cyclohexanol, the steps which consist in gradually introducing alkali metal hydroxide and at least its molecular equivalent of cyclohexanol to a fused mixture of alkali metal hydroxide and products of the reaction of said hydroxide with cyclohexanol, whereby oxidation of the cyclohexanol proceeds continuously, and during said operation removing portions of the reaction mixture at such rate as to maintain a nearly constant volume of the reacting mixture.

11. In a method of oxidizing cyclohexanol to produce chiefly caproic acid, the step of reacting cyclohexanol with fused alkali metal hydroxide in the presence of water and at a temperature between about 330° and about 360° C.

12. In a method of oxidizing cyclohexanol to produce chiefly caproic acid, the step which consists in reacting cyclohexanol with fused potassium hydroxide in the presence of water at a temperature of between about 330° and about 360° C.

13. In a method of oxidizing cyclohexanol to produce chiefly cyclohexyl-butyric acid, the step which consists in reacting cyclohexanol with fused alkali metal hydroxide in the presence of water and at a temperature between about 290° and about 320° C.

14. In a method of oxidizing cyclohexanol to produce chiefly cyclohexyl-butyric acid, the step which consists in reacting cyclohexanol with fused potassium hydroxide in the presence of water at a temperature between about 290° and about 320° C.

15. In a method of oxidizing cyclohexanol to produce chiefly an acid having the empirical formula $C_{12}H_{20}O_2$, the step which consists in reacting cyclohexanol with an anhydrous fused mixture of sodium and potassium hydroxides at a temperature between about 275° and about 320° C.

16. In a method of oxidizing cyclohexanol to produce chiefly an acid having the empirical formula $C_{12}H_{20}O_2$, the step which consists in reacting cyclohexanol with an anhydrous fused mixture of sodium and potassium hydroxides in a molecular ratio between about $$\frac{1NaOH}{2KOH} \text{ and } \frac{3NaOH}{1KOH}$$

at a temperature between about 275° and about 320° C.

17. In a method wherein an acid having the empirical formula $C_{12}H_{20}O_2$ is produced by reacting a compound selected from the class consisting of cyclohexanol and cyclohexanone with fused alkali metal hydroxide, the step of reacting said acid of empirical formula $C_{12}H_{20}O_2$ with fused alkali metal hydroxide to form a salt of cyclohexyl-butyric acid.

EARL L. PELTON.